United States Patent [19]
Arai et al.

[11] Patent Number: 5,499,308
[45] Date of Patent: Mar. 12, 1996

[54] GUIDED-WAVE OPTICAL MULTI/DEMULTIPLEXER

[75] Inventors: Hideaki Arai; Hisato Uetsuka, both of Hitachi, Japan

[73] Assignee: Hitachi Cable, Ltd., Tokyo, Japan

[21] Appl. No.: 403,263

[22] Filed: Mar. 13, 1995

[30] Foreign Application Priority Data

Mar. 18, 1994 [JP] Japan ................................. 6-048064
Jul. 27, 1994 [JP] Japan ................................. 6-175418

[51] Int. Cl.⁶ ........................................... G02B 6/26
[52] U.S. Cl. ........................... 385/27; 385/15; 359/127
[58] Field of Search ................................ 385/14, 15, 16, 385/39, 40, 130, 131, 132, 24, 27, 21, 30, 31, 18; 359/126, 152, 127, 900, 114, 115, 117

[56] References Cited

U.S. PATENT DOCUMENTS

| | | | |
|---|---|---|---|
| 4,592,043 | 5/1986 | Williams | 385/18 |
| 4,652,079 | 3/1987 | Shaw et al. | 385/30 |
| 4,725,797 | 2/1988 | Thompson et al. | 333/212 |
| 5,179,604 | 1/1993 | Yanagawa et al. | 385/24 |
| 5,418,868 | 5/1995 | Cohen et al. | 385/16 |

OTHER PUBLICATIONS

"Guided-Wave Optical WDM Circuit with Mach-Zehnder Interferometer configuration" by T. Kominato et al. the Journal of Institute of Electronics, Information & Communication Engr. of Japan, C-I, vol. J73-C-1, No. 5, pp. 354 to 359 issued May 1990.

*Primary Examiner*—Akm E. Ullah
*Attorney, Agent, or Firm*—Antonelli, Terry, Stout & Kraus

[57] ABSTRACT

A guided-wave optical multi/demultiplexer is capable of providing a wide wavelength band freely. Each of two directional couplers is constructed so that the coupling ratio of light intensity in the wavelength $\lambda_2$ is at least 50% and the coupling ratio of light intensity in the wavelength $\lambda_3$ having a wavelength band in close proximity to the wavelength $\lambda_1$ is 0% or 100%, the light in the wave band containing the wavelength $\lambda_1$ and the wavelength $\lambda_3$ and the light in the wave band containing the wavelength $\lambda_2$ being multiplexed and demultiplexed.

10 Claims, 4 Drawing Sheets

GUIDED-WAVE OPTICAL MULTI/DEMULTIPLEXER

BACKGROUND OF THE INVENTION

The present invention relates to a guided-wave optical multi/demultiplexer which operates to multiplex and demultiplex two wave bands of light utilizing the principle of a Mach-Zehnder interferometer, and, more particularly, to a guided-wave optical multi/demultiplexer which is capable of operation in a wide wave band freely, and a method of multiplexing and demultiplexing.

A guided-wave optical multi/demultiplexer of the Mach-Zehnder interferometer type (hereinafter referred to as an "optical multi/demultiplexer") utilizing the principle of a Mach-Zehnder interferometer, has been described in, for example, an article entitled "Guided-Wave Optical WDM Circuit with Mach-Zehnder Interferometer configuration" by T. Kominato et al. in the Journal of Institute of Electronics, Information and Communication Engineers of Japan, C-I, Vol. J73-C-1, No. 5, pages 354 to 359, issued May, 1990. This publication discloses example which is constructed as shown in FIG.4. That is, this optical multi/demultiplexer is composed of two directional couplers 16, 17 having a coupling ratio of light intensity of $k(\lambda)$ and a phase shift region formed of two single mode guide-wave paths having guide-wave path lengths of L and L+ΔL. When light having a wavelength of $\lambda_1$ and light having a wavelength of $\lambda_2$ are input at a port 20 at one end of a guide-wave path 14, light having a wavelength of $\lambda_1$ is output from a port 21 at the other end of a guide-wave path 14, and the light having a wavelength of $\lambda_2$ is output from a port 22 at the other end of a guide-wave path 13.

The condition of the phase shift region required for multiplexing and demultiplexing the light having a wavelength of $\lambda_1$ and the light having a wavelength of $\lambda_2$ is given by the following equation. (1) Providing that the equivalent refractive index of the guide-wave path is $n(\lambda)$, the difference in the optical path length, taking the equivalent refractive index into consideration, is $n(\lambda)\Delta L$, and N is an arbitrary integer.

$$n(\lambda)\Delta L = (N \pm \tfrac{1}{2})\lambda_1 = N\lambda_2 \quad (1)$$

It can be understood from equation (1) that the wavelengths $\lambda_1$ and $\lambda_2$ are not be arbitrarily obtained, but are restricted to a combination satisfying the following equation.

$$\{\lambda_1 i/n(\lambda_1)\}/|\lambda_1/n(\lambda_1) - \lambda_2/n(\lambda_2)| = 2N \quad (2)$$

In Equation (2), the wavelength dependence of the equivalent refractive index of the guide-wave path is taken into consideration.

Equation (2) can be rewritten as follows, and the pass wavelength and the stop wavelength at each port can be accurately set by determining ΔL in the following equation (3).

$$\Delta L = (N \pm \tfrac{1}{2})\lambda_1/n(\lambda_1) = N\lambda_2/n(\lambda_2) \quad (3)$$

In this optical multi/demultiplexer, letting the transmittance from $port_0$ to $port_1$ be $T_{0-1}$, the transmittance from $port_0$ to $port_2$ be $T_{0-2}$, each of the transmittances is given by each of the following equations.

$$T_{0-1}(\lambda) = \exp(-2\alpha L)[\{(1 - k(\lambda)) - k(\lambda) \cdot \exp(-\alpha\Delta L)\}^2 + 4k(\lambda) \cdot (1 - k(\lambda)) \cdot \exp(-\alpha\Delta L) \cdot \sin^2(\beta\Delta L/2)] \quad (4)$$

$$T_{0-2}(\lambda) = \exp(-2\alpha L) [\{(k(\lambda) \cdot (1 - k(\lambda)))^{1/2} - (k(\lambda) \cdot (1 - k(\lambda)))^{1/2} \cdot \exp(-\alpha\Delta L)\}^2 + 4k(\lambda) \cdot (1 - k(\lambda)) \cdot \exp(-\alpha\Delta L) \cdot \cos^2(\beta\Delta L/2)] \quad (5)$$

Therein, when the guide-wave path satisfies the condition that $\exp(-\alpha\Delta L)$ is nearly equal to 1, the transmittances of $port_1$ and $port_2$ for each of the wavelengths $\lambda_1$ and $\lambda_2$ are derived from Equation (1) to Equation (5) and are given by the following equations.

$$T_{0-1}(\lambda_1) = \exp(-2\alpha\Delta L) \quad (6)$$

$$T_{0-1}(\lambda_2) = \{1 - 2k(\lambda_2)\}^2 \exp(-2\alpha\Delta L) \quad (7)$$

$$T_{0-2}(\lambda_2) = 4k(\lambda_2)\{1 - 2k(\lambda_2)\}(-2\alpha\Delta L) \quad (8)$$

$$T_{0-2}(\lambda_1) = 0 \quad (9)$$

Taking notice of $k(\lambda)$ in Equation (6) to Equation (9), it can be understood that an optical multi/demultiplexer having a low insertion loss and having a cross-talk of 0 (zero) can be attained by setting the coupling ratio $k(\lambda_2)$ of the light intensity of wavelength $\lambda_2$ for the light to be output from the $port_2$.

FIGS. 5A and 5B are graphs showing the characteristic of an optical multi/demultiplexer designed under the condition of the wavelength $\lambda_1 = 1.337$ μm and the wavelength $\lambda_2 = 1.56$ μm according to this design method. FIG. 5A shows the insertion loss versus wavelength characteristic of the $port_1$ 21 when light is input at the $port_0$ 20, and FIG. 5B shows the insertion loss versus wavelength characteristic of the $port_2$ 22 when light is input at the $port_0$ 20. The pass wavelength band P whose loss is less than 0.1 dB in the $port_1$ 21 is a wavelength of 1.315 μm to a wavelength of 1.350 μm, and the band width is 0.034 μm, which is narrow. On the other hand, the stop wavelength band C whose loss is more than 20 dB in the $port_2$ 22 is a wavelength of 1.322 μm to a wavelength of 1.350 μm, and the band width is 0.028 μm, which is narrow. Low insertion loss and high isolation can be realized by utilizing a wavelength band restricted by both of the above wavelength bands for the wavelength band containing wavelength $\lambda_1$. Since the pass wavelength band and the stop wavelength band in the $port_1$ and the $port_2$ are complementary, light in the band containing wavelength $\lambda_1$ and light in the band containing wavelength $\lambda_2$ can be multiplexed and demultiplexed with low insertion loss and low cross-talk.

In the above conventional technology, however the wavelengths $\lambda_1$, $\lambda_2$ are not arbitrarily obtained but are limited to only the combination of wavelengths satisfying Equation (2). Therefore, the wavelength may not be freely chosen. In addition to this, there is a problem in that allowable range for wavelength shift due to deviation of the wavelength in the light source is narrow, since the width of the pass wavelength band and the width of the stop wavelength band are narrow.

SUMMARY OF THE INVENTION

An object of the present invention is to solve the above problems and to provide a guided wave optical multi/demultiplexer which is capable of providing a wide wavelength band freely.

The object of the present invention can be attained by providing a guided-wave optical multi/demultiplexer having directional couplers in both sides of a phase shift region having a difference of optical path length which differs from an integral times a value multiplying an inverse number of an equivalent refractive index to a wavelength $\lambda_1$ by one-half times the value and agrees with an integral times a value multiplying an inverse number of an equivalent refractive index to a wavelength $\lambda_2$, and which is constructed so that the coupling ratio of the light intensity in the wavelength $\lambda_2$ is at least at 50%, the light in the wave band containing the wavelength $\lambda_1$ and the light in the wave band containing the wavelength $\lambda_2$ being multiplexed and demultiplexed, wherein each of the two directional couplers is constructed so that the coupling ratio of light intensity in the wavelength $\lambda_2$ is at least 50% and the coupling ratio of the light intensity in the wavelength $\lambda_3$ having a wavelength band in close proximity to the wavelength $\lambda_1$ is 0% or 100%, the light in the wave band containing the wavelength $\lambda_1$ and the wavelength $\lambda_3$ and the light in the wave band containing the wavelength $\lambda_2$ being multiplexed and demultiplexed. Therein, the wavelength $\lambda_3$ having a wavelength band in close proximity to the wavelength $\lambda_1$ is preferably such a wavelength that the difference between the wavelength $\lambda_1$ and the wavelength $\lambda_3$ is smaller than one-half of the difference between the wavelength $\lambda_1$ and the wavelength $\lambda_2$.

The object of the present invention can be also attained by providing two guided-wave paths on a substrate, the two guided-wave paths being placed in proximity to each other with a given gap and in parallel to each other along a given length at two positions to form said directional couplers, at least one of said guided-wave paths being by-passed between the two positions to form the directional coupler.

The object of the present invention can be also attained by setting the wavelength $\lambda_1$ is 1.23~1.27 µm, setting the wavelength $\lambda_2$ to 1.54~1.58 µm, setting the wavelength $\lambda_3$ to 1.305~1.345 µm, setting the refractive index of the core of the wave-guide to 1.462~1.463, setting the refractive index of the cladding to 1.457~1.459, the setting height of the core to 7~9 µm, setting the width of the core to 7~9 µm, setting the proximate gap between the guide-wave paths in the directional coupler to 3~4.5 µm, setting the parallel length to 1.8~2.8 mm, and setting the difference of optical path length to 1.8~2.8 µm.

In the past, as described above, a directional coupler has been constructed so that the coupling ratio of the light intensity in the wavelength $\lambda_2$ is at least 50%, and the light in a band containing the wavelength $\lambda_1$ and the light in a band containing the wavelength $\lambda_2$ are multiplexed and demultiplexed by utilizing the optical multi/demultiplexing effect produced by the principle of a Mach-Zehnder interferometer.

In the present invention, in order to substantially expand the band width of the wavelength $\lambda_1$, the wavelength $\lambda_3$ having a wavelength band in proximity to the wavelength $\lambda_1$ is newly introduced in addition to the wavelength $\lambda_1$ and the wavelength $\lambda_2$. With the construction of the present invention, a directional coupler can be constructed to have such a function that the coupling ratio of light intensity in the wavelength $\lambda_3$ having a wavelength band in close proximity to the wavelength $\lambda_1$ is 0% or 100%. Let the ports of a directional coupler be $port_0$, $port_1$, and $port_2$, according to the conventional way. Light having a wavelength $\lambda_3$ input from the $port_0$ is output only from the $port_1$ through either of the optical paths of the phase shift region between the two directional couplers. That is, a pass wavelength band containing the wavelength $\lambda_3$ is formed in the $port_1$, and a stop wavelength band containing the wavelength $\lambda_3$ is formed in the $port_2$.

Since the conventional characteristic is maintained for the light of wavelength $\lambda_1$ and the light of wavelength $\lambda_2$, the pass wavelength band and the stop wavelength band from the $port_0$ to the $port_1$ are expanded so as to contain the wavelength $\lambda_3$.

Therewith, it is possible to choose a wavelength from a wide band containing the wavelength $\lambda_1$ and the wavelength $\lambda_3$ freely. At the same time, the allowable range for wavelength shift can be widened.

The directional coupler is constructed by placing two guided-wave paths in proximity to each other with a given gap and in parallel to each other along a given length. It can be realized that the coupling ratio of light intensity at the wavelength $\lambda_2$ is 50% and the coupling ratio of light intensity at the wavelength $\lambda_3$ having a wavelength band in close proximity to the wavelength $\lambda_1$ is 0% or 100% by choosing the gap between the guided-wave paths in proximity to each other and the length of the guided-wave paths in parallel to each other.

DETAILED DESCRIPTION OF THE PREFERRED EMBODIMENTS

An embodiment according to the present invention will be described in detail below, referring to the accompanying drawings.

Figure 1A:
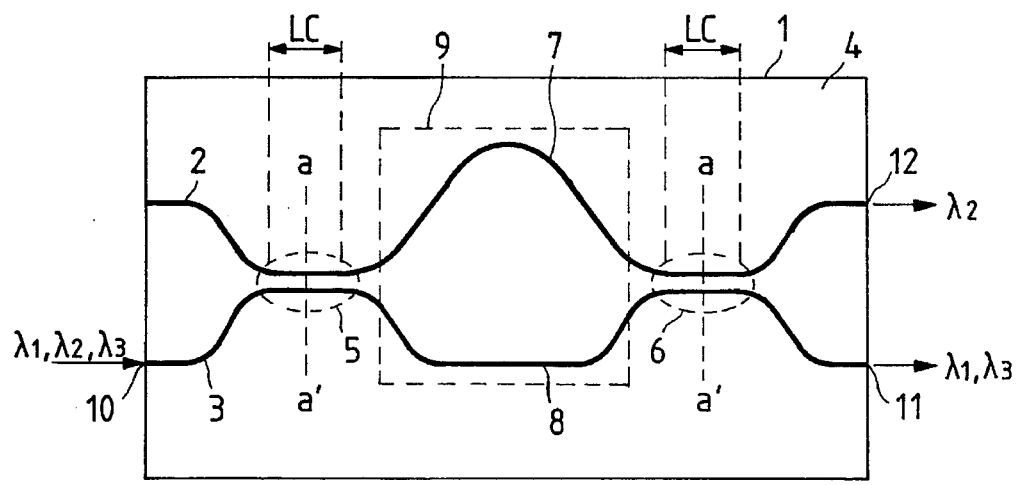
FIG. 1(a) is a plan view and FIG. 1(b) is a cross-sectional view taking on the plane of the line a–a' of FIG. 1A, showing an embodiment of an optical multi/demultiplexer according to the present invention.
Figure 1B:
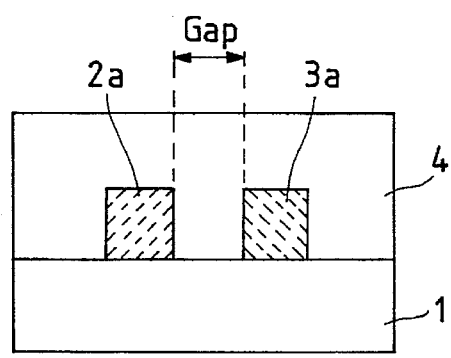
Figure 4:
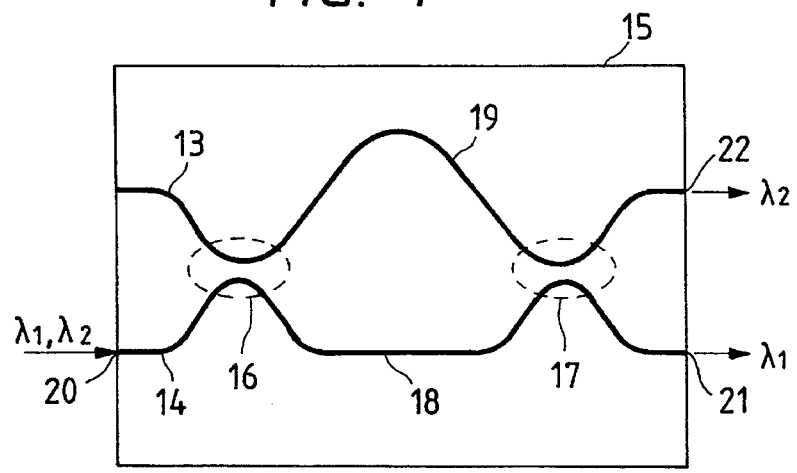
FIG. 4 is a plan view showing a conventional optical multi/demultiplexer.

FIG. 1A is a plan view and FIG. 1B is a cross-sectional view showing a guided-wave optical multi/demultiplexer of Mach-Zehnder interferometer type (hereinafter, referred to as "optical multi/demultiplexer") according to the present invention. As shown in the drawings, the optical multi/demultiplexer is constructed with two guided-wave paths (cores) 2, 3 formed on a substrate 1. The guided-wave paths 2, 3 are formed by covering cores 2a, 3a with a cladding 4, and directional couplers 5, 6 and a phase shift region 9 are formed by placing the guided-wave paths 5, 6 in parallel to and in proximity to each other or in going round through such a way, for example, bending the guided-wave path with bending radius of 30 mm or straightening it. There are two portions where the guided-wave paths 5, 6 are placed in parallel to and in proximity to each other, thereby forming the directional couplers 5, 6 respectively. Between the two portions, each of the guided-wave paths 2, 3 individually forms a single mode guided-wave path, and goes round in a different pattern and has a different length of guided-wave path from each other to form the phase shift region 9. That is, by classifying it according to its functions, the optical multi/demultiplexer can be classified into three parts, the directional coupler 5, the phase shift region 9 composed of an arm 7 and an arm 8 having different lengths, and the directional coupler 6. The end portion of the guided-wave path 3 in the side of the directional coupler 5 is the $port_0$ 10, the end portion of the guided-wave path 3 in the side of the directional coupler 6 is the $port_1$ 11, and the end portion of the guided-wave path 2 in the side of the directional coupler 6 is the $port_2$ 12.

The two directional couplers 5 and 6 are of the same types, and the length LC and the gap $G_{ap}$ in the portion where the guided-wave paths 2, 3 are placed in parallel to and in proximity to each other are set, such that the coupling ratio of light intensity in the wavelength $\lambda_2$ is 50% and the coupling ratio of light intensity in the wavelength $\lambda_3$ is 100%. Further, in the phase shift region 9, the difference $\Delta L$ between the optical path lengths of the arm 7 and the arm 8 is set such that the phase shift of one-half wavelength is given to the light having wavelength $\lambda_1$ and not given to the light having wavelength $\lambda_2$.

In this case, $\lambda_1$=1.25 μm, $\lambda_2$=1.56 μm and $\lambda_3$=1.325 μm. Based on these values, the properties and proportions of the optical multi/demultiplexer are set such that the refractive index of the cores 2a, 3a against the substrate is 1.458, the refractive index of the cladding 4 against the cores 2a, 3a is 1.4624, the height of the cores 2a, 3a is 8 μm, the width of the cores 2a, 3a is 8 μm, and LC=2.337 mm, $G_{ap}$=3.54 μm, and $\Delta L$=2.158 μm.

The operation of the embodiment will be described below.

A conventional directional coupler has been constructed, as described above, so that the coupling ratio of the light intensity at the wavelength $\lambda_2$ of 1.56 μm is 50%, and the light in a band containing the wavelength $\lambda_1$ of 1.337 μm and the light in a band containing the wavelength $\lambda_2$ are multiplexed and demultiplexed by utilizing the optical multi/demultiplexing effect produced by the principle of a Mach-Zehnder interferometer.

The directional coupler in this embodiment according to the present invention is constructed such that the coupling ratio of light intensity at the wavelength $\lambda_2$ of 1.56 μm is 50% and the coupling ratio of the light intensity at the wavelength $\lambda_3$ of 1.325 is 100%. Light having a wavelength $\lambda_3$ input from the $port_0$ 10 is output only from the $port_1$ 11 through either of the optical paths of the phase shift region between the two directional couplers. That is, a pass wavelength band containing the wavelength $\lambda_3$ is formed in the $port_1$ 11, and a stop wavelength band containing the wavelength $\lambda_3$ is formed in the $port_2$ 12.

The conventional characteristic is maintained for the light of wavelength $\lambda_1$ and the light of wavelength $\lambda_2$. However, a wavelength chosen for the wavelength $\lambda_1$ in the embodiment is shorter than the conventional wavelength $\lambda_1$. On the other hand, the wavelength $\lambda_3$ in the embodiment becomes a longer wavelength than the conventional wavelength $\lambda_1$. Thereby, the pass wavelength band and the stop wavelength band from the $port_0$ to the $port_1$ are expanded toward both sides of the conventional band so as to contain the wavelength $\lambda_3$ and the wavelength $\lambda_3$ in the embodiment.

Figure 2A:
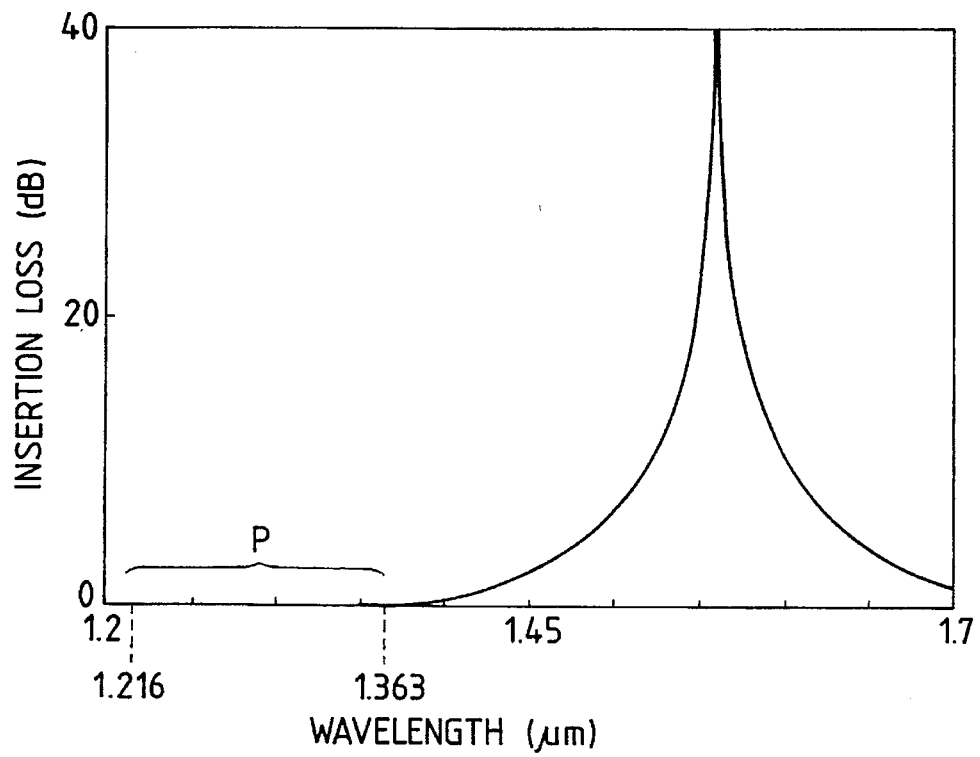
FIGS. 2A–2B are graphs showing the insertion loss versus wavelength characteristic of an optical multi/demultiplexer according to the present invention.
Figure 2B:
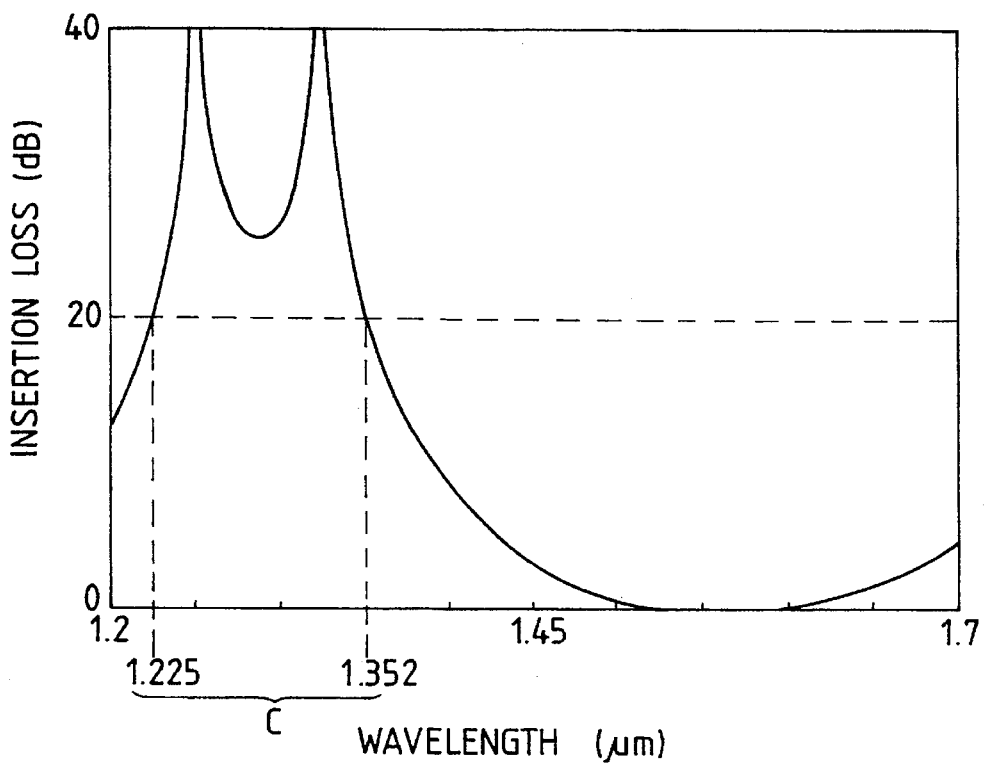
Figure 5A:
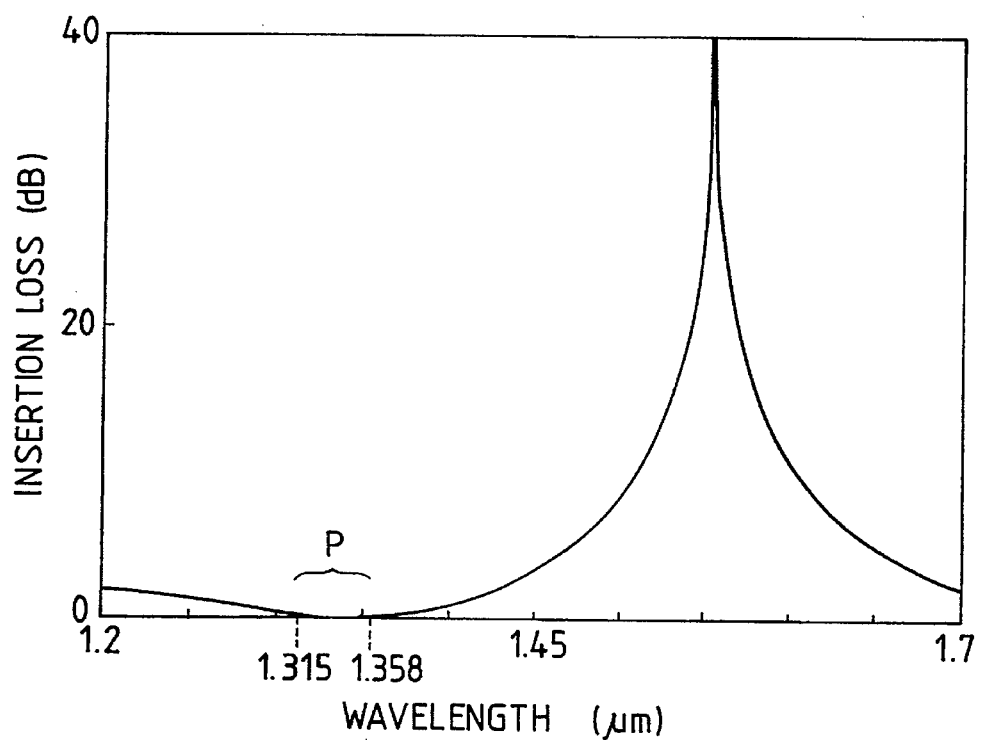
FIGS. 5A–5B are graphs showing the insertion loss versus wavelength characteristic of a conventional optical multi/demultiplexer.
Figure 5B:
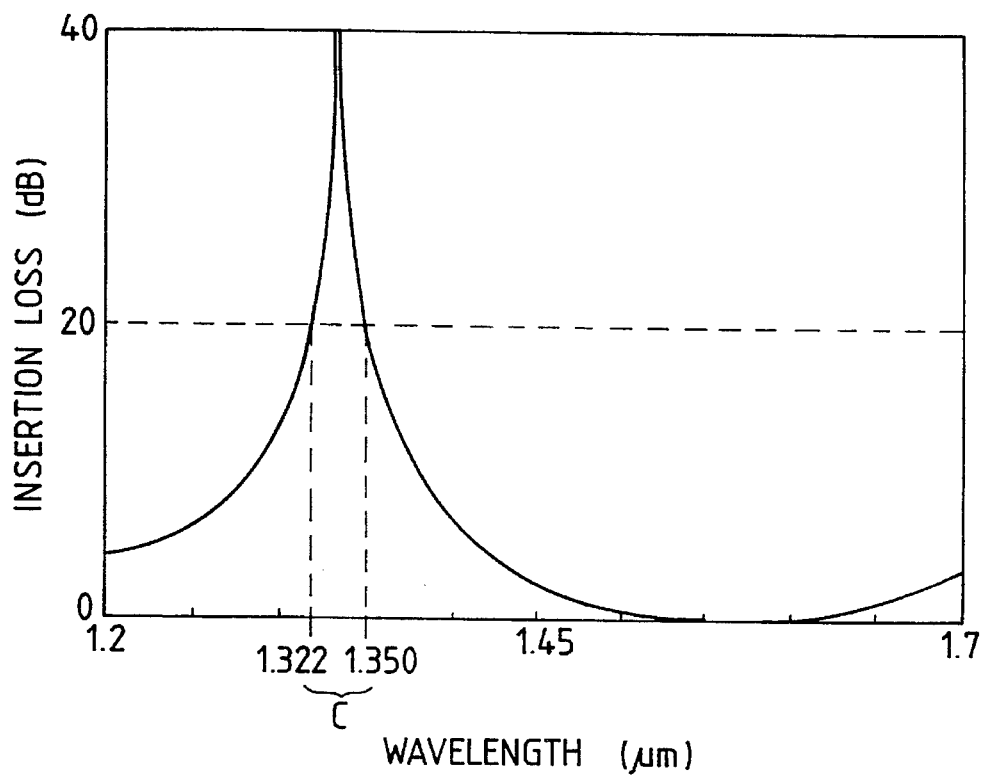

FIGS. 2A and 2B are graphs showing the characteristic of an optical multi/demultiplexer according to the present invention. FIG. 2 A shows the insertion loss versus wavelength characteristic of the $port_1$ 11 when light is input at the $port_0$ 10, and FIG. 2B shows the insertion loss versus wavelength characteristic of the $port_2$ 12 when light is input at the $port_0$ 10. The pass wavelength band P whose loss is less than 0.1 dB in the $port_1$ 11 is a wavelength of 1.216 μm to a wavelength of 1.363 μm, and the band width P is 0.147 μm. On the other hand, the stop wavelength band C whose loss is more than 20 dB in the $port_2$ 12 is a wavelength of 1.225 μm to a wavelength of 1.352 μm, and the band width is 0.127 μm. Compared to the conventional result shown in FIGS. 5A and 5B, it can be understood that the pass wavelength band P and the stop wavelength band C are substantially wider.

As described above, according to the present invention, both the pass wavelength band P in one of the ports and the stop wavelength C in the other of the ports are substantially widened. Therefore, by applying the present invention, for example, to an optical multi/demultiplexer for multiplexing and demultiplexing an optical signal in the wavelength band of 1.3 μm and an optical signal in the wavelength band of 1.5 μm, which are widely used in optical communication, it is possible to realize an optical multi/demultiplexer which is capable of allowing a deviation in the wavelength of a laser oscillation of wavelength 1.3 μm by widening the pass wavelength band P and the stop wavelength band C in the wavelength band of 1.3 μm. Further, in the prior art there has been a limitation in choosing wavelength, but in the present invention the wavelength can be freely chosen from a wide band. By incorporating the guided-wave optical multi/demultiplexer according to the present invention described above, it is possible to construct an ONU (optical network unit) for optical communication use.

Another embodiment will be described below.

In the above embodiment, the directional coupler is constructed in such a way that the coupling ratio of light intensity in the wavelength $\lambda_3$ is 100%. However, it may be constructed in such a way that the coupling ratio is 0%. In this case, $\lambda_1$=1.25 μm, $\lambda_2$=1.56 μm and $\lambda_3$=1.325 μm. Based on these values, the properties and proportions of the optical multi/demultiplexer are set such that the refractive index of the cores against the substrate is 1.458, the refractive index of the cladding against the cores being 1.4624, the height of the cores being 8 μm, the width of the cores being 8 μm, and LC=1.878 mm, $G_{ap}$=1.49 μm, and $\Delta L$=2.158 μm. The values of LC and $\Delta L$ are different from those in the aforementioned embodiment. With this construction, a characteristic nearly equal to that in FIGS. 2A and 2B is obtained.

In a case where $\lambda_1$=1.25 μm, $\lambda_2$=1.56 μm and $\lambda_3$=1.325 μm, the preferable ranges of the properties and proportions of the optical multi/demultiplexer are that the refractive index of the cores is 1.462 to 1.463, the refractive index of the cladding is 1.457 to 1.459, the height of the cores is 7 to 9 μm, the width of the cores is 7 to 9 μm, LC=1.878 mm, the gap of the proximate guided-wave path $G_{ap}$ is 3 to 4 μm, and the length of the parallel guided-wave path $\Delta L$ being 1.8 to 2.8 μm. The directional coupler is formed in such a manner that the guided-wave paths are bent with bending a radius of 20 to 50 mm at a position where the gap between the guided-wave paths becomes 3 to 4 μm so as to approach in parallel to each other, and are straightened at a position where the guided-wave paths become in parallel to each other, and then are gradually bent apart symmetrically at the ending portion of the straight part. The wavelength $\lambda_3$ newly introduced in the present invention should have a wavelength band in proximity to the wavelength $\lambda_1$. That is, it is preferable that each of the wavelengths $\lambda_1$, $\lambda_2$, $\lambda_3$ is set so that the difference between the wavelength $\lambda_1$ and the wavelength $\lambda_3$ is smaller than one-half of the difference between the wavelength $\lambda_1$ and said wavelength $\lambda_2$. For example, it is preferable that the wavelength $\lambda_1$ and the wavelength $\lambda_3$ are contained in the band of wavelength of 1.3 μm and the wavelength $\lambda_2$ is contained in the band of wavelength of 1.55 μm. It is more preferable that the wavelength $\lambda_1$ is 1.23 to 1.27 μm, the wavelength $\lambda_2$ is 1.54 to 1.58 μm, and the wavelength $\lambda_3$ is 1.305 to 1.345 μm.

Figure 3A:
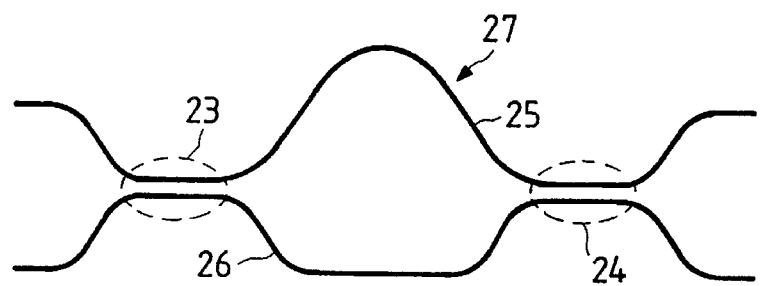
FIGS. 3A–3D are plan views showing the shapes of guided-wave paths in optical multi/demultiplexers according to the present invention.
Figure 3B:
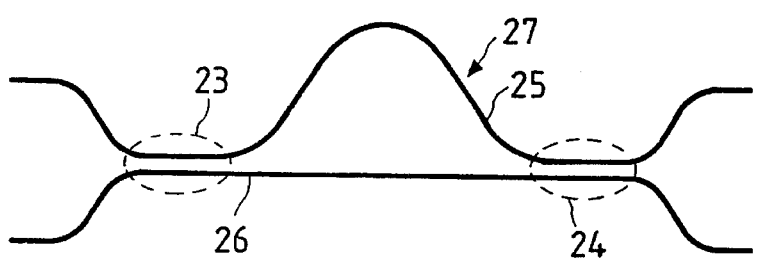
Figure 3C:
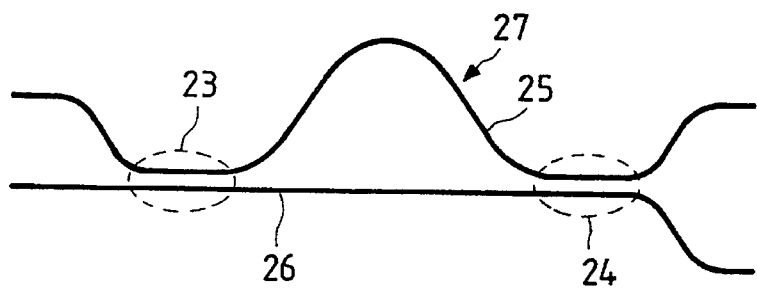
Figure 3D:
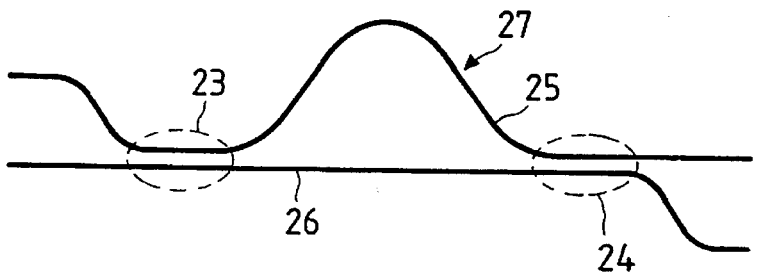

Each of FIG. 3A to FIG. 3D shows an optical multi/demultiplexer according to the present invention. In the optical multi/demultiplexer in FIG. 3A, the shapes of the guided-wave paths 25, 26 are the same as those in the aforementioned embodiment. However, the shapes of the guided-wave paths 25, 26 in the other figures are different from those in FIG. 3A. In the case of FIG. 3B, one guided-wave path 26 is nearly straight, but the other guided-wave path 25 is bent. The guided-wave path 25 approaches to and becomes parallel to the guided-wave path 26 at one position to form a directional coupler 23, and departs from the guided-wave path 25 and goes round to form a phase shift region 27, and then again approaches to and becomes parallel to the guided-wave path 26 at the other position to form a directional coupler 24. In the case of FIG. 3C, one guided-wave path 26 is nearly straight between the directional coupler 23 and one of the ports. In the case of FIG. 3D, in addition to the shape of FIG. 3C, the guided-wave path 25 is nearly straight between the directional coupler 24 and the other port. As described above, the shape of the guided-wave path can be arbitrarily formed so long as two directional couplers and a phase shift region are provided.

Although the materials which are used in the optical multi/demultiplexer according to the present invention are $SiO_2$ for the substrate 1, $SiO_2$–$TiO_2$ for the cores and $SiO_2$–$B_2O_5$–$P_2O_3$ for the cladding, it is possible to employ dielectric materials, such as glasses of the silica group, semiconductor materials, organic materials. As for fabrication, it is possible to use a well-known fabrication technology (photolithography, reactive ion etching and so on) which has been used as the fabrication technology in the field of semiconductor integrated circuits.

The present invention displays the following excellent effects.

(1) It is possible to realize an optical multi/demultiplexer capable of operation with any wavelength.

(2) It is possible to freely choose a wavelength from a wide wavelength band.

What is claimed is:

1. A guided-wave optical multi/demultiplexer having directional couplers in both sides of a phase shift region having a difference of optical path length which differs from an integral times a value multiplying an inverse number of an equivalent refractive index to a wavelength $\lambda_1$ by one-half times the value and agrees with an integral times a value multiplying an inverse number of an equivalent refractive index to a wavelength $\lambda_2$, and is constructed so that the coupling ratio of light intensity at said wavelength $\lambda_2$ is at least 50%, the light in the wave band containing said wavelength $\lambda_1$ and the light in the wave band containing said wavelength $\lambda_2$ being multiplexed and demultiplexed, wherein:

each of said two directional couplers is constructed so that the coupling ratio of light intensity in said wavelength $\lambda_2$ is at least 50% and the coupling ratio of light intensity in said wavelength $\lambda_3$ having a wavelength band in close proximity to said wavelength $\lambda_1$ is 0% or 100%, the light in the wave band containing said wavelength $\lambda_1$ and said wavelength $\lambda_3$ and the light in the wave band containing said wavelength $\lambda_2$ being multiplexed and demultiplexed.

2. A guided-wave optical multi/demultiplexer according to claim 1, wherein:

two guided-wave paths are provided on a substrate, said two guided-wave paths being placed in proximity to each other with a given gap there between and in parallel to each other along a given length at two positions to form said directional couplers, at least one of said guided-wave paths being by-passed between said two positions to form said directional coupler.

3. A guided-wave optical multi/demultiplexer according to claim 1, wherein:

each of said wavelengths $\lambda_1$, $\lambda_2$, $\lambda_3$ is set so that the difference between said wavelength $\lambda_1$ and said wavelength $\lambda_3$ is smaller than one-half of the difference between said wavelength $\lambda_1$ and said wavelength $\lambda_2$.

4. A guided-wave optical multi/demultiplexer according to claim 2, wherein:

each of said wavelengths $\lambda_1$, $\lambda_2$, $\lambda_3$ is set so that the difference between said wavelength $\lambda_1$ and said wavelength $\lambda_3$ is smaller than one-half of the difference between said wavelength $\lambda_1$ and said wavelength $\lambda_2$.

5. A guided-wave optical multi/demultiplexer according to any one of claim 1 and claim 2, wherein:

the light in the wave band of wavelength of 1.3 µm and the light in the wave band of wavelength of 1.55 µm are multiplexed and demultiplexed.

6. A guided-wave optical multi/demultiplexer according to claim 5, wherein:

said wavelength $\lambda_1$ and said wavelength $\lambda_3$ are contained in the said wave band of wavelength of 1.3 µm and said wavelength $\lambda_2$ is contained in the said wave band of wavelength of 1.55 µm.

7. A guided-wave optical multi/demultiplexer according to claim 6, wherein:

said wavelength $\lambda_1$ is 1.23~1.27 µm, said wavelength $\lambda_2$ is 1.54~1.58 µm, said wavelength $\lambda_3$ is 1.305~1.345 µm.

8. A guided-wave optical multi/demultiplexer according to claim 4, wherein:

said wavelength $\lambda_1$ is 1.23~1.27 µm, said wavelength $\lambda_2$ is 1.54~1.58 µm, said wavelength $\lambda_3$ is 1.305~1.345 µm, the refractive index of the core of said wave-guide being 1.462~1.463, the refractive index of the cladding being 1.457~1.459, the height of the core being 7~9 µm, the width of the core being 7~9 µm, the proximate gap between the guide-wave paths in said directional coupler being 3~4.5 µm, the parallel length being 1.8~2.8 mm, and said difference of optical path length being 1.8~2.8 µm.

9. An optical network unit module incorporating a guide-wave optical multi/demultiplexer according to any one of claim 1 to claim 4 and claim 8.

10. A method of multiplexing and demultiplexing light in a wave band containing a wavelength $\lambda_1$ and light in a wave band containing a wavelength $\lambda_2$ using a guided-wave optical multi-demultiplexer in which two guided-wave paths are provided on a substrate, said two guided-wave paths being placed in proximity to each other with a given gap therebetween and in parallel to each other along a given length in two positions to form two directional couplers, at least one of said guided-wave paths being by-passed between said two positions to form a directional coupler, wherein:

said two directional couplers are constructed so that the coupling ratio of light intensity at said wavelength $\lambda_2$ is 50% and the coupling ratio of light intensity at said wavelength $\lambda_3$ having a wavelength band in close proximity to said wavelength $\lambda_1$ is 0% or 100% the light in the wave band of 1.3 µm containing said wavelength $\lambda_1$ and said wavelength $\lambda_3$ and the light in the wave band of 1.55 µm containing said wavelength $\lambda_2$ being multiplexed and demultiplexed.

* * * * *